June 11, 1957 J. GIUFFRIDA 2,795,728

TELEVISION CIRCUITS

Filed Sept. 8, 1953 2 Sheets-Sheet 1

INVENTOR.
Joseph Giuffrida

BY George W. Crowley

ATTORNEY

INVENTOR.
Joseph Giuffrida
BY George W. Crowley
ATTORNEY

United States Patent Office 2,795,728 Patented June 11, 1957

2,795,728

TELEVISION CIRCUITS

Joseph Giuffrida, Peabody, Mass., assignor to Columbia Broadcasting System, Inc., a corporation of New York, doing business under the name of CBS-Hytron, a division of Columbia Broadcasting System, Inc., Danvers, Mass.

Application September 8, 1953, Serial No. 378,868

11 Claims. (Cl. 315—13)

This invention relates in general to television picture tubes and in particular to circuits for improving the quality of pictures presented on such tubes.

In conventional black-and-white picture tubes it is not possible to achieve full focus over the entire screen area with the focusing circuits normally provided. The reason for this failure lies in the fact that focus at a fixed distance from the center of deflection of the beam is the only focus available. Unless the screen surface is spherical with a radius of curvature equal to the distance from screen to beam deflection center, focus becomes possible only at a central spot or in one of a series of substantially circular patterns. In color television tubes using triple beams, flat screens and flat masks, the problems are multiplied. Here, the three beams must be made to converge in each aperture of a flat mask having apertures over its entire surface and each beam must be brought to a focus at each point of impingement on the flat screen if a high quality picture is to be obtained.

In black-and-white television the problem has been largely ignored, but in color television some attempts have been made to achieve proper convergence and focus. Dynamic convergence circuits and dynamic focus circuits have been resorted to in most practical color systems. These circuits are designed to provide focus and convergence points varying with beam deflection. Simply stated, when the distance from the deflection center to the screen or mask is extended, as when areas remote from the center are scanned, the convergence point and focal point of the beams are correspondingly displaced.

Several specific circuits have been used in practice for dynamic convergence and dynamic focus. The "Proceedings of the Institute of Radio Engineers," issue of October 1951, contains an article at page 1249 et seq. which describes typical approaches to the problem. In the specific circuits set forth, the desired voltage waveforms are usually generated in the horizontal and vertical deflection amplifiers. A capacitor of value insufficient to completely bypass the cathode resistors is used. The desired voltages are then derived from the cathode resistors and have a roughly sawtooth shape.

It is well known that the optimum voltage wave shape for dynamic convergence and dynamic focus is a parabola, which is not perfectly obtained even by integration of the modified sawtooth and recombination of portions of the sawtooth with the integrated output. Parabolas or approximate parabolas so obtained become practically unrelated to the scanning pattern of the beam. Nor could the sawtooth wave be modified by incorporating controls in the horizontal and vertical deflection amplifiers themselves, because changes made in those units would automatically and undesirably affect the scanning pattern. Hence, as a compromise, controls have been provided in the amplifiers following the horizontal and vertical deflection amplifiers. These controls have not achieved their purpose, however, for several reasons the most important of which is probably their isolation from the scanning pattern, to which the dynamic convergence and dynamic focus should, of course, bear a direct relation.

Therefore, it is an object of the present invention to provide improved dynamic focus and dynamic convergence for television picture tubes.

It is a further object to provide adequate control of dynamic convergence and dynamic wave shapes.

It is a still further object to provide dynamic focus and convergence systems wherein the wave forms are directly related to the scanning pattern.

Still another object is to increase resolution in picture tubes by accurately focusing and converging the beams from the electron guns.

In general the present invention consists in a circuit for extracting wave shapes directly from the deflection yokes of picture tubes. Yoke current in magnetically deflected systems increases linearly with time in order that the beam scanning rate be held constant. In other words, the wave form of the yoke current is a sawtooth. Passing such a wave form through a linear impedance element to convert it to a voltage, and then squaring the voltage wave form, in the mathematical sense, results in the formation of a voltage of parabolic shape. The process of squaring referred to is that wherein the instantaneous output voltage is equal to the square of the instantaneous input voltage. This voltage may then be amplified, inverted where necessary, and applied to the dynamic focus and dynamic convergence electrodes of the picture tube. Provision is made for accentuation of either of the peaks of the parabola by making the linear impedance element variable. Thus, any existing asymmetrical characteristics of the deflection system may be offset. For a better understanding of the invention, together with other and further objects, features, and advantages, reference should be made to the following description which is to be read in connection with the accompanying drawing in which:

Figure 1:
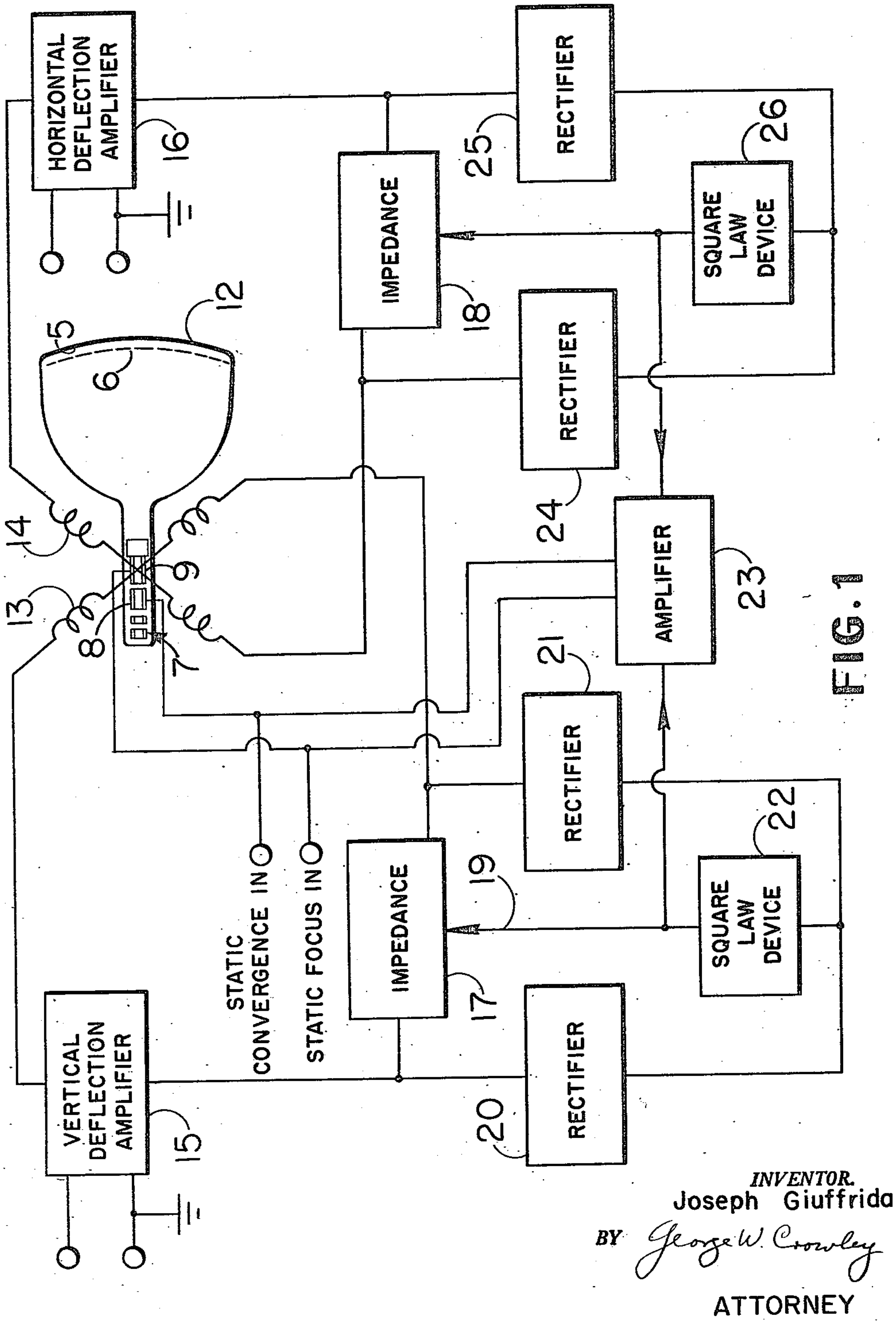
Fig. 1 is a block diagram of the system as applied to a picture tube.

Referring now to Fig. 1, there is shown a cathode ray tube 12 having a viewing screen 5 made up of phosphors for generating three colors, an aperture mask 6, and electron guns 7 (only one of which is shown for convenience) properly arranged relative to the mask to excite each type of phosphor. For purposes of the present invention, the geometry of screen and mask are immaterial, that is, dot, stripe or other known types of screens may be used with suitably matched masks. A focusing electrode 8 and a convergence electrode 9, both of which may be of known form, may be incorporated in each of the electron guns 7.

Electromagnetic deflection of the beams is provided by yoke coils 13 and 14. A vertical deflection amplifier 15 which operates in the conventional manner, as is well known in present television circuitry, provides a substantially sawtooth current wave to yoke coil 13 and a horizontal deflection amplifier 16 provides a similar signal to yoke coil 14. The return lead from yoke coil 13 has in series therewith a linear impedance element 17 and the return lead from yoke coil 14 has in series therewith a linear impedance element 18. The current passing through yoke coil 13 thus develops a sawtooth voltage wave form across linear impedance element 17. A variable contact 19 on impedance element 17 permits the voltage at any point along impedance element 17 to be tapped. On either side of impedance element 17 are leads extending to a rectifier 20 and a rectifier 21, respectively. When the instantaneous voltage at the junction of the leads to impedance element 17 and rectifier 20 is positive, current flows through rectifier 20 and then through a square law device 22. Similarly, when the junction of impedance element 17 and rectifier 21 is instantaneously positive, current flows through rectifier 21 and through square law device 22.

Figure 2:
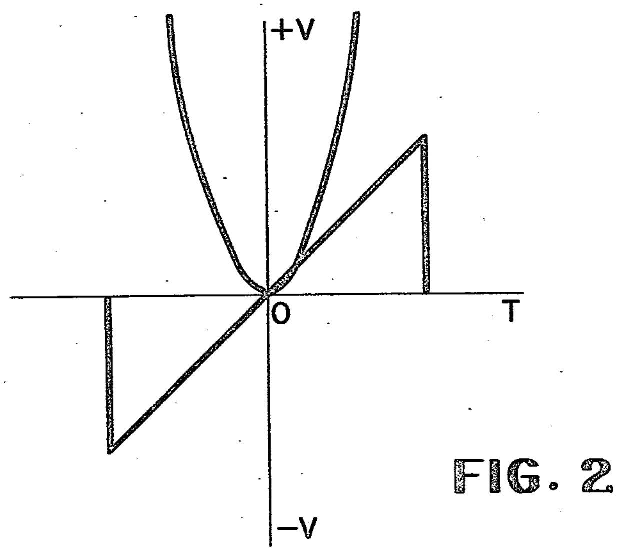
Fig. 2 is a diagram indicating generally voltage-time curves.

Square law device 22 has the characteristic of providing a voltage output which varies as the square of current variation. Thus, since the sawtooth current through the square law device varies linearly, the voltage output varies parabolically. The curves shown in Fig. 2 indicate the composite action of the rectifiers 20 and 21 and the square law device 22. The negative and positive portions of the sawtooth wave are separately rectified in rectifiers 20 and 21, recombined and squared in square law device 22 to give a parabolic output.

Either peak of the parabola may be accentuated by varying tap 19 on impedance element 17. The output of square law device 22 is fed to dynamic convergence and dynamic focus amplifier 23, and from amplifier 23 the voltages are applied to the convergence and focus electrodes of tube 12. The dynamic voltages are, of course, superimposed upon the usual static focus and convergence voltages which are provided in the usual fashion.

By means of the circuitry described above, dynamic focus and convergence are provided in a vertical plane and are directly related to the deflection of the beam in a vertical direction. Impedance element 18 with rectifiers 24 and 25 and square law device 26 operate in the same manner as their counterparts in the vertical deflection circuit. The output from square law device 26 is also applied to amplifier 23 and fed to the dynamic focus and dynamic convergence electrodes to maintain proper convergence and focus as the beam is scanned over the screen horizontally.

Figure 3:
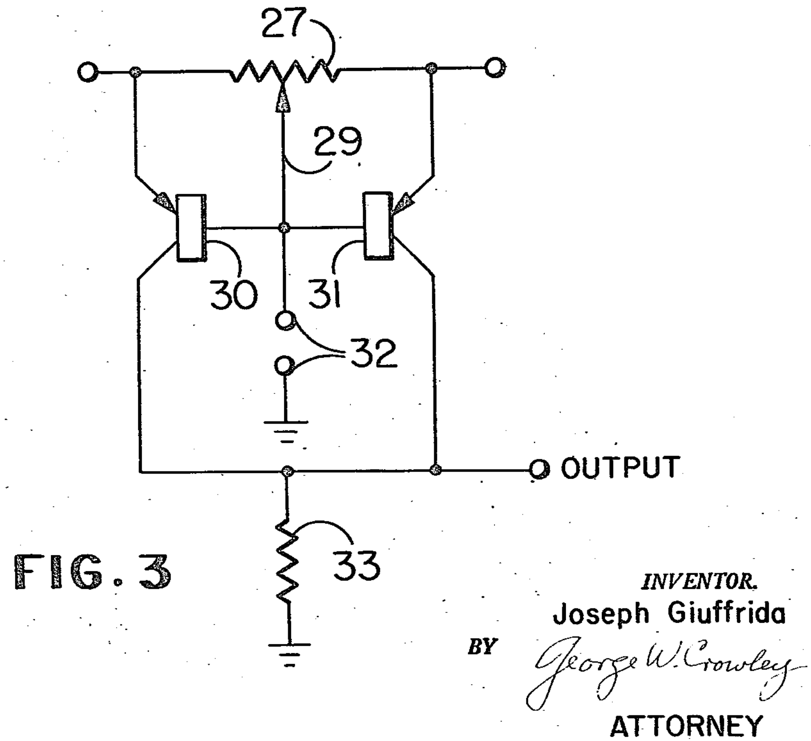
Fig. 3 is a circuit diagram of an embodiment of the invention which utilizes transistors to combine the functions necessary to provide suitable wave forms.

Referring now to Fig. 3, there is shown a particularly effective means for achieving the desired parabolic dynamic convergence and focus wave forms. Although several circuits known in the art may be adapted to operate as square law devices and numerous suitable rectifiers and amplifiers are commonly available, the transistor permits a compact, efficient and inexpensively operated circuit to be used for rectification, squaring and amplification. In this circuit a linear impedance element 27 occupies the position of impedance element 17 in Fig. 1. A tap 29 is similar to tap 19 of Fig. 1. Rectifiers 20 and 21, square law device 22, and amplifier 23 are replaced by transistors 30 and 31. A source of direct voltage is connected at terminals 32, 32 is provided to operate transistors 30 and 31. A resistor 33 acts as the load resistance and the parabolic wave form is taken from the load resistance for direct application to the dynamic focus and dynamic convergence electrodes of a tube similar to the illustrated tube 12 of Fig. 1.

The operation of the circuit of Fig. 3 is eminently satisfactory because of the inherent characteristics of the transistor. A p-n-p junction transistor of typical design has been used, but other transistor types may be used with equivalent ease and good results. The voltage sawtooth wave is developed across the linear impedance element 27 from the flow therethrough of deflection yoke currents. This voltage is alternatively positive at the emitter terminals of transistors 30 and 31. A considerable portion of the emitter voltage-emitter current curve of a transistor is such that with small applied voltages of the magnitude used here, the desired power law for squaring is achieved. That is, as emitter voltage is increased, emitter current increases as the square of that voltage. As a result a parabolic current wave form is derived from the sawtooth voltage input in the manner described hereinabove. This parabolic current wave form is the varying emitter current in the transistor, which appears linearly amplified as collector current in the output. As is well known, however, collector current in transistors is substantially directly proportional to emitter current, which provides linear amplification of the parabolic wave form. As with tap 19, in the general case shown in Fig. 1, tap 29 permits either of the peaks of the parabola to be accentuated to compensate for asymmetry in picture tube or circuits.

The invention has been described primarily with reference to color television picture tubes. However, its applicability is far broader than only that field. Basically, an electron-optical problem wherein beam focusing or converging is desired on a flat surface has been solved. In fact, any stream or streams of charged particles being deflected to scan a flat surface may be similarly controlled and brought to focus or convergence utilizing the principles of the present invention. Possible applications such as in an image-orthicon, a radar indicator, an electron-microscope, a cyclotron, or any one of a host of other devices having beams of charged particles will immediately suggest themselves to those skilled in the art.

Within the television field itself, the type of display, whether black-and-white or any of the various color systems being considered at this time, is immaterial, since the present invention offers a solution to a problem common to all of the systems.

The invention should, therefore, be limited only by the spirit and scope of the appended claims.

What is claimed is:

1. In a cathode ray tube having at least an electron beam for scanning a surface, means for deriving a voltage varying substantially as a function of the instantaneous position of impingement of said electron beam on said surface, means for producing a squared voltage, the instantaneous value of which is equal to the square of the instantaneous value of the first said voltage, and means for applying said squared voltage to said cathode ray tube to vary the focal point of said beam in accordance with the instantaneous magnitude of said squared voltage.

2. A dynamic focus and dynamic convergence circuit for a cathode ray tube having a plurality of electron beams and elements for deflecting, focusing, and converging said beams comprising, means for extracting a wave from said deflection elements, said wave varying directly with deflection of said electron beams, means for squaring said wave, means for amplifying said wave after squaring, and means for applying said amplified, squared wave to the focusing and converging elements of said tube to vary the focus and convergence points of said beams.

3. A dynamic focus and dynamic convergence circuit for a cathode ray tube having a plurality of electron beams and elements for deflecting, focusing, and converging said beams comprising, linear impedance elements in circuit with said deflecting elements for developing voltages varying linearly with deflection of said beams, voltage squaring circuits coupled to said linear impedance elements for squaring the wave developed therein, amplifiers coupled to said voltage squaring circuits to amplify the squared wave, the output of said amplifier being coupled to said focusing and converging elements to vary the focus and convergence points of said beams in accordance with deflection of said beams.

4. A dynamic focus and dynamic convergence circuit for a cathode ray tube having a plurality of electron beams, elements for deflecting, focusing, and converging said beams, a phosphor screen and an aperture mask comprising, means for extracting from said deflecting elements waves varying directly with the deflection of said electron beams, means for producing a squared voltage from each of said deflecting elements waves, the instantaneous value of each of said squared voltages being equal to the square of the instantaneous value of each of said waves, and means for applying said squared waves to said focusing and converging elements to cause said beams to focus at all points of impingement on said phosphor screen and to converge in each aperture of said aperture mask.

5. A circuit for focusing a beam of charged particles at all points of impingement of said beam on a flat surface comprising, means for deriving voltage varying linearly with the instantaneous position of impingement of said beam on said flat surface, means for producing a squared voltage from each of said deflecting elements waves, the instantaneous value of each of said squared voltages being equal to the square of the instantaneous values of each of said voltages, and means for varying the focal length of said beam in accordance with the instantaneous values of said squared voltages.

6. In an evacuated envelope containing means for generating, focusing and deflecting a beam of charged particles, a circuit for focusing said beam on all points of a flat surface on which said beam impinges comprising, means coupled to said deflecting means for extracting waves varying linearly with the instantaneous position of impingement of said beam on said flat surface, means for producing a squared voltage from each of said deflecting elements waves, the instantaneous value of each of said squared voltages being equal to the square of the instantaneous value of each of said waves, and means for applying said squared waves to said focusing means to vary the focal length of said beam in accordance with the instantaneous values of said squared voltages.

7. A dynamic focusing system for a cathode ray tube having at least an electron beam, means for focusing said beam, a substantially flat screen, first means for deflecting said beam in one direction across said screen, and second means for deflecting said beam in a second direction perpendicular to said first direction across said screen comprising, two similar circuits, one of said circuits being in series with said first deflecting means, the other being in series with said second deflecting means, each said circuit including a linear impedance element having one end thereof connected directly to its respective deflecting means, a rectifier connected to either side of said impedance element, a tap on said impedance element, a square law device, said rectifiers each being returned to said tap through said square law device, the output of said square law device varying as the square of the input, whereby the linearly varying deflection current through said impedance element is converted to a parabolically varying voltage output from said square law device, means for linearly amplifying the parabolic output of said square law device, and means for applying the amplified parabolic voltages to said beam focusing means to maintain said beam in focus over the entire surface of said screen.

8. Apparatus as in claim 7 wherein said taps on said linear impedance elements are adjustable to permit variation of the peaks of said parabolic voltages to compensate for asymmetry in said cathode ray tube.

9. A dynamic focusing system for a cathode ray tube having at least an electron beam, means for focusing said beam, a substantially flat screen, first means for deflecting said beam across said screen in one direction, second means for deflecting said beam across said screen in a direction perpendicular to said first direction comprising two similar circuits, one of said circuits being in series with said first deflecting means, the other being in series with said second deflecting means, each said circuit including a linear impedance element having one end thereof connected directly to its respective deflecting means, a pair of transistors, the emitter of one transistor being connected to one side of said impedance element, the emitter of the other transistor being connected to the other side of said impedance element, a tap on said impedance element, a source of direct voltage, the bases of said transistors being connected together and to said tap and said voltage source, the collectors of said transistors being connected together and to said beam focusing means, whereby a linearly varying deflection current is converted to a parabolically varying voltage for application to said beam focusing means to vary the focal length of said beam in accordance with the point of impingement of said beam on said screen.

10. Apparatus as in claim 9 wherein said taps on said impedance elements are adjustable to vary the peaks of said parabolic voltages to compensate for asymmetry in said cathode ray tube.

11. Apparatus as in claim 10 wherein said cathode ray tube contains a plurality of electron beams, a convergence element, and an aperture mask, and means for applying the outputs of the collectors of said transistors to said convergence element to provide convergence of said beams in all apertures of said aperture mask.

References Cited in the file of this patent

UNITED STATES PATENTS

| | | |
|---|---|---|
| 2,178,093 | Zworykin et al. | Oct. 31, 1939 |
| 2,572,858 | Harrison | Oct. 30, 1951 |
| 2,572,861 | Hutter | Oct. 30, 1951 |
| 2,664,521 | Schlesinger | Dec. 29, 1953 |
| 2,687,493 | Kirkwood | Aug. 24, 1954 |
| 2,706,796 | Tannenbaum | Apr. 19, 1955 |
| 2,726,354 | Stark | Dec. 6, 1955 |
| 2,726,355 | Friend | Dec. 6, 1955 |